United States Patent [19]
Burgess

[11] Patent Number: 5,078,903
[45] Date of Patent: Jan. 7, 1992

[54] PRESSURE-FED DRUM FILTER SEPARATION APPARATUS WITH ELONGATED, TANGENTIAL NOZZLES

[75] Inventor: George Burgess, Auckland, New Zealand

[73] Assignee: Contra-Shear Holdings Ltd., Auckland, New Zealand

[21] Appl. No.: 439,784

[22] Filed: Nov. 21, 1989

[30] Foreign Application Priority Data

Nov. 22, 1988 [NZ] New Zealand .................. 227050

[51] Int. Cl.$^5$ .......................................... B01D 33/11
[52] U.S. Cl. .................................. 210/781; 209/284; 210/143; 210/403; 210/456; 210/784
[58] Field of Search .................. 210/360.1, 380.1, 403, 210/404, 304, 456, 784, 143, 402, 781, 788; 209/254, 270, 284, 285, 286

[56] References Cited

U.S. PATENT DOCUMENTS

| | | | |
|---|---|---|---|
| 3,255,888 | 6/1966 | Balfour | 210/404 |
| 4,113,626 | 9/1978 | Detcher | 210/456 |
| 4,236,999 | 12/1980 | Burgess et al. | 210/403 |
| 4,248,709 | 2/1981 | Irving | 210/403 |
| 4,507,202 | 3/1985 | Nord et al. | 210/403 |
| 4,869,823 | 9/1989 | Otani et al. | 210/403 |

FOREIGN PATENT DOCUMENTS

| | | | |
|---|---|---|---|
| 102284 | 3/1962 | Netherlands | 210/403 |
| WO88/06479 | 9/1988 | World Int. Prop. O. | 210/403 |

Primary Examiner—Robert A. Dawson
Assistant Examiner—Joseph Drodge
Attorney, Agent, or Firm—Rodman & Rodman

[57] ABSTRACT

A pressure-fed apparatus for the separation of solids and liquids from a suspension has a fine-apertured rotatable screening drum, inlet means to introduce a flow of suspension into the interior of the screening drum under pressure. Feed means comprising a plurality of nozzles eject the suspension tangentially onto the inner surface of the screening drum and from a position directly adjacent the said inner surface. Suspension may be ejected with or against the direction of rotation of the drum.

9 Claims, 4 Drawing Sheets

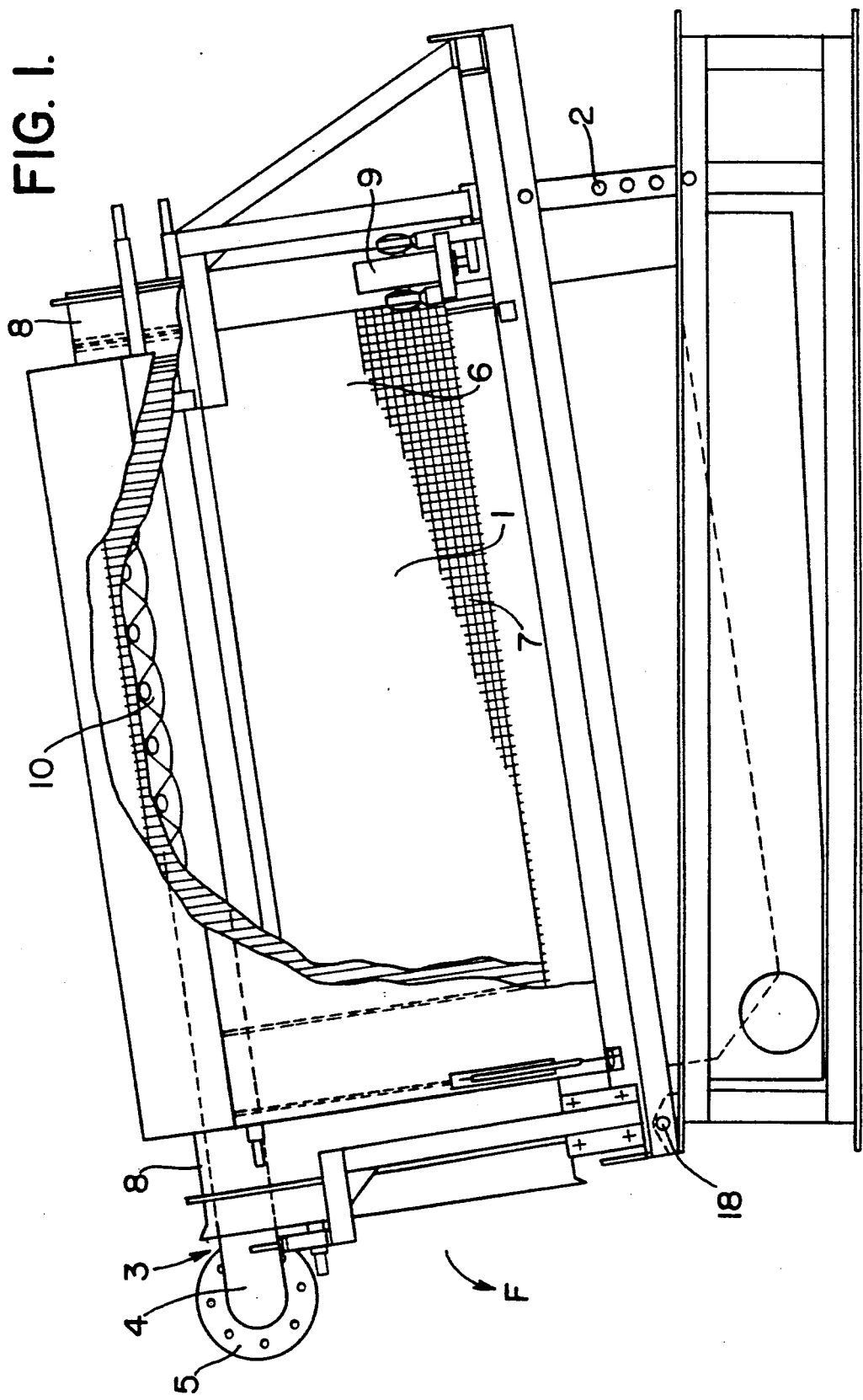

PRESSURE-FED DRUM FILTER SEPARATION APPARATUS WITH ELONGATED, TANGENTIAL NOZZLES

BACKGROUND TO INVENTION

This invention relates to separation apparatus and a method for operating the same.

More particularly but not exclusively, the invention relates to a pressure infeed apparatus for use in the separation of solids from liquids by screening.

To the present time certain types of stationary pressure fed separation devices have been available but to in varying degrees have suffered from the disadvantage of being complex and/or ineffecient.

It is thus an object of the present invention to provide a rotatable pressure-fed separation apparatus which can provide a simple yet efficient separation apparatus and to provide specialised feed means for the ejection under pressure of the suspension to be separated.

Furhter objects of the present invention will become apparent from the following description.

BRIEF SUMMARY OF THE PRESENT INVENTION

According to one aspect of the present invention there is thus provided a separation apparatus having a fine-apertured rotatable screening drum, inlet means to introduce a flow of suspension into the interior of the drum under pressure and feed means comprising a plurality of nozzles to eject the suspension tangentially onto the inner surface of the screening drum directly adjacent the said surface.

According to a further aspect of the present invention there is provided a method of separation of solids and liquids from a suspension by screening, said method comprising the steps of:
1. Rotating a fine-apertured screening drum;
2. Introducing a flow of suspension into the drum under pressure;
3. Ejecting by one or more feed means being nozzles the suspension tangentially onto the inner surface of the screening drum the said nozzles being situated directly adjacent the said surface;
4. Extracting screen solids from within the drum.

BRIEF DESCRIPTION OF THE DRAWINGS

Further aspects of this invention, will become apparent from the following description given by way of example of a possible embodiment thereof and in which reference is made to the accompanying drawings wherein:

FIG. 1: Shows a side elevation of a separation apparatus, with a section of the drum wall removed to show details of the inlet means.

DETAILED DESCRIPTION OF THE PREFERRED EMBODIMENTS OF THE PRESENT INVENTION

Figure 3:
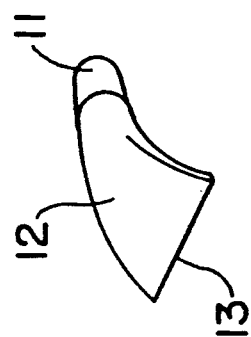
FIG. 3: Is a perspective view of a feed means.

Referring to the accompanying drawings, the apparatus comprises a hollow screening drum 1 which is rotatably mounted about its axls which lies substantially in a horizontal plane and which is adjustable by means of an adjustment means 2. The apparatus has a rotation means (not shown) to rotate the screening drum and inlet means 3 comprising a manifold 4 and an inlet flange 5 which is adapted to be connected to the supply of suspension to be screened. The inlet means 3 is adapted to introduce a flow of solid/liquids suspension into the interior of the drum under pressure.

The screening drum 1 has an inner wall 6 formed as a screen by having a plurality of screening wires 7 spaced apart in a parallel arrangement about the periphery of the drum. It has been found that apertures typically ranging from 25 to 150 micron are suitable with feed pressures through inlet means 3 typically ranging from 3 PSIG to 100 PSIG.

The screening drum 1, as mentioned above, is rotatable and this rotation is achieved by having the drum mounted on trunnions or rollers. About the periphery or rim at each end of the said drum is a circular channel shaped tire 8 with the said trunnion wheels 9 being adapted to fit into and run in the channels of the said tires. The said two trunnion wheels at each side of the drum are mounted on a shaft which may be driven by an electric motor or similar drive means.

As shown in FIG. 1 manifold 4 is substantially horizontal and shown to extend along substantially the length of the screening drum 1. It has a plurality of nozzles 10 thereon. The said nozzles 10 may be arranged so as to abut each other or be spaced apart. Likewise, they may be arranged along part or the entire length of manifold 4.

Figure 2:
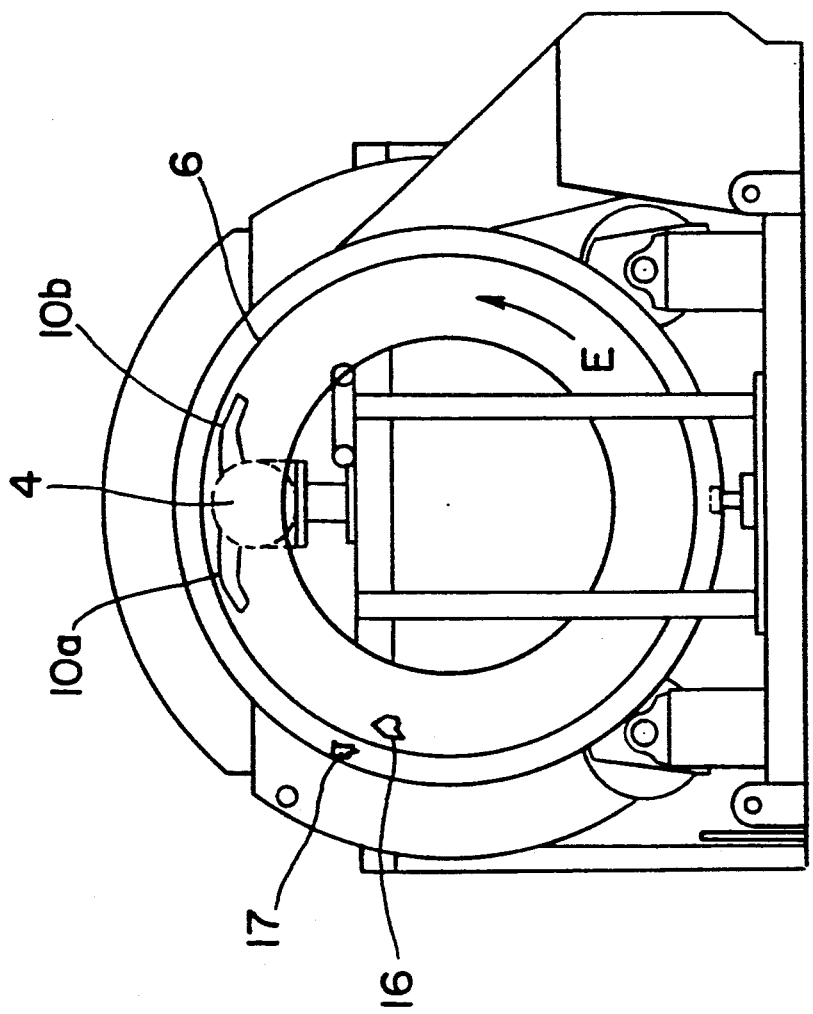
FIG. 2: Is an end elevation of the apparatus of FIG. 1 showing the inlet end of the apparatus.

FIG. 2 shows the apparatus from an end view. Attached to the manifold 4 are nozzles 10a and 10b. It will be appreciated from this view that the nozzles 10a and 10b extend in opposite directions away from manifold 4 and in substantially the same plane as the concave inner wall 8 of the screening drum 1.

FIG. 3 shows the nozzle 10. As can be seen it comprises an attachment means 11 and a body portion 12. The attachment means 11 may be substantially annular in shape and is adapted to fit to the manifold 4 in a suitable manner. The body portion 12 may be fan-like in shape extending from an initial annular shape to a broadened and flattened shape towards its distal end 13.

Figure 4:
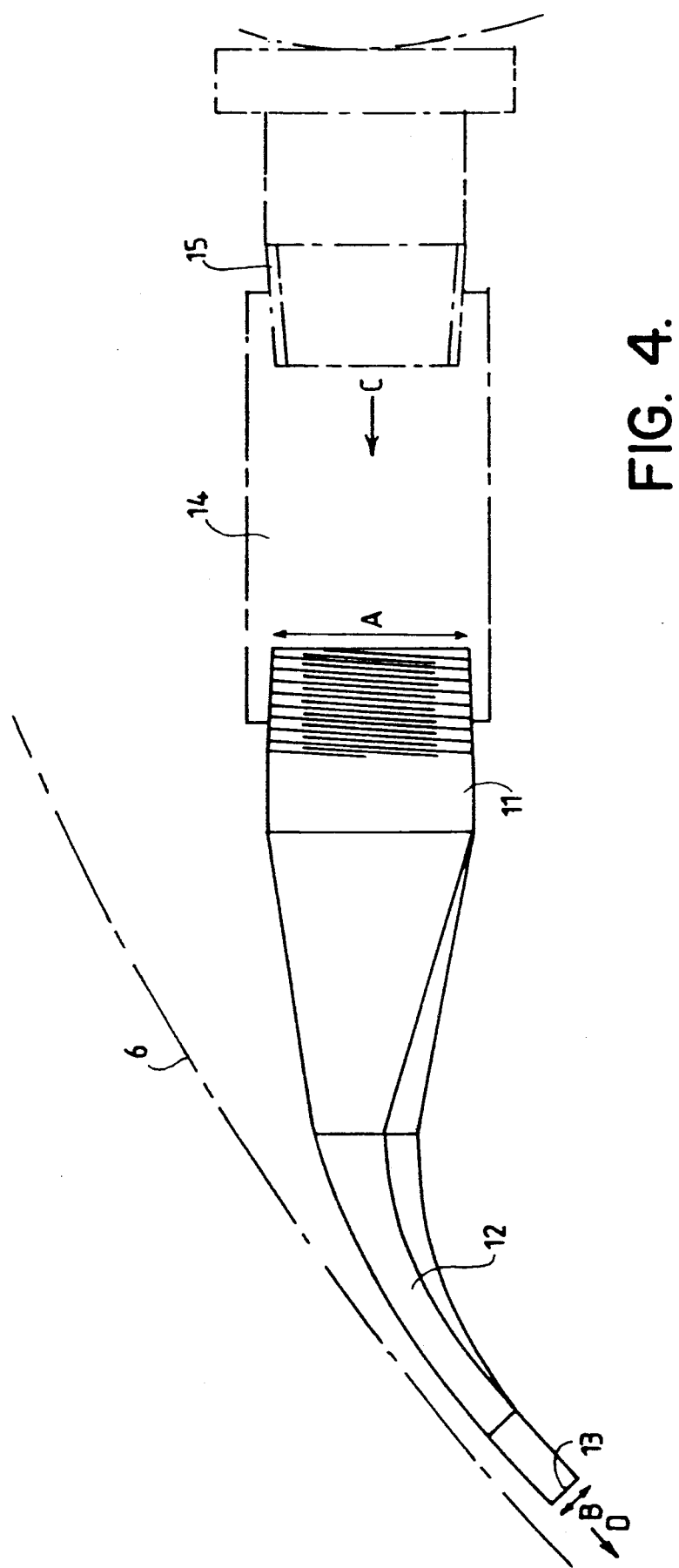
FIG. 4: Shows a cross sectional side view of the said feed means.

FIG. 4 shows the said nozzle 10 from a different aspect. It shows the annular attachment means 11 and the body portion 12. As can be seen the body portion curves towards its distal end 13 and it will also be seen that the said curvature is in substantially the same plane as the inner wall 6. In fact it can be seen that the distal end of the body portion 12 is substantially parallel to the said inner wall 6.

The nozzle 10 has a stem 14 which is itself attached or formed as part of a valve 15. Together these two items 14 and 15 connect the attachment means 11 of the nozzle 10 to the manifold 4.

Figure 5:
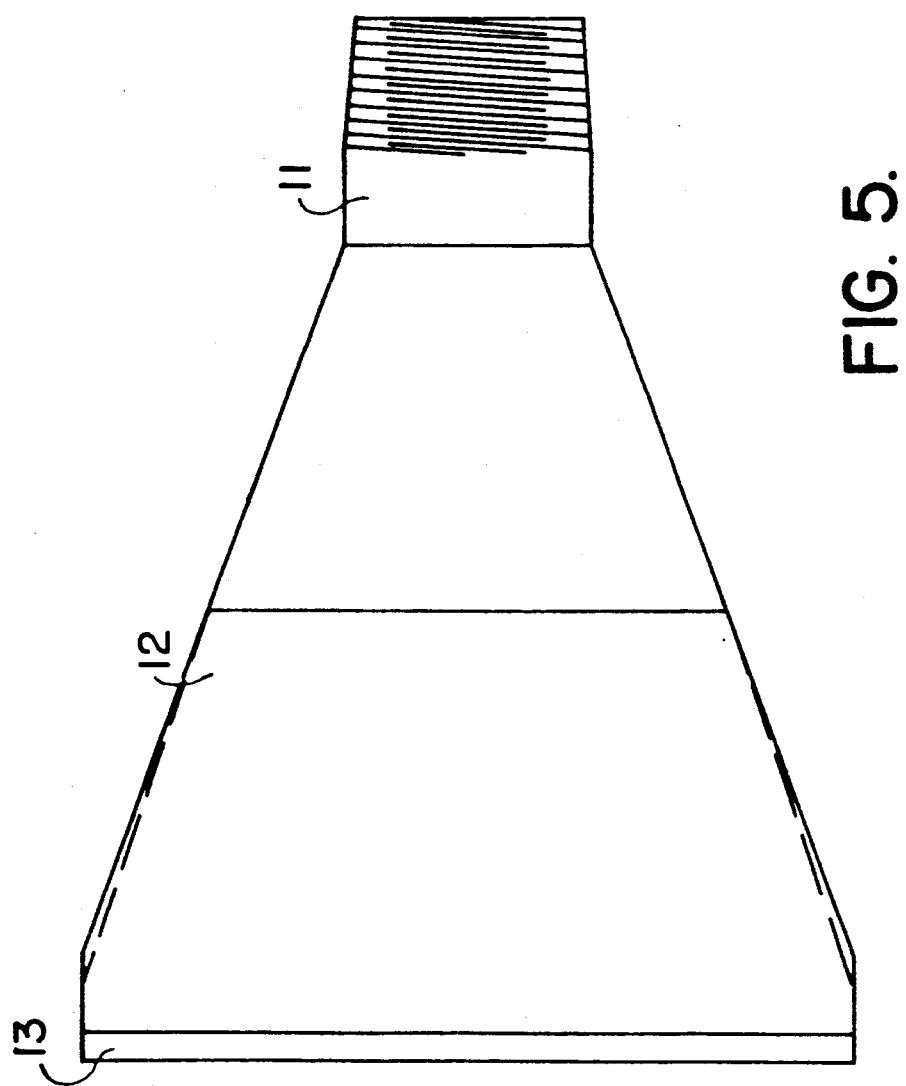
FIG. 5: Shows a view of the said feed means from above.

FIG. 5 shows a view of the nozzle 10 from above. As can be seen the body portion 12 broadens towards portion 13 so that the said nozzle 10 is substantially fan-shaped from above. This particular design has been found to improve the flow characteristics of the nozzle.

In use the suspension is fed into manifold 4 under pressure. It is then transported along manifold 4 to nozzles 10. Nozzles 10a and 10b may be operated simultaneously. Alternatively, nozzles 10a or 10b may be operated individually. The screening drum 1 is adapted to be rotated in two directions. Assuming that the direction of rotation is as per arrow E of FIG. 2 and that both nozzles 10a and 10b are in operation it will be seen that suspension will be ejected into screening drum 1 against inner wall 6 against the flow of rotation (nozzle 10b) and with the flow of rotation (nozzle 10a). In this way material will be ejected against the inner wall 6 with and against the flow of rotation meaning that separation may occur in two discrete ways. Alternatively, depending on the type of material being separated, the apparatus may be used as a "contrary flow" or "pro-flow" system. That is, by adjusting the nozzles and/or the direction of rotation of the screen drum 1.

Referring to FIG. 4 the direction of flow of suspension is shown generally by arrow C. The flow of material, under pressure, into the screening drum 1 is shown by arrow D. The ingress port of attachment means 11 has a diameter referenced by arrow A while the ingress port of the nozzle is referenced by arrow B. These two areas A and B are substantially the same which allows for the efficient transfer of suspension under pressure through the nozzle and into the screening drum 1. It will be appreciated that any interference with the flow of material could lead to a back-up in pressure and inevitably a loss of performance.

As will be seen from the distal end of nozzle 10 it runs in substantially the same plane as the inner wall 6. While the tangential introduction of suspension into screening devices is known, prior systems have tended to simply allow the suspension to drop onto a concave wall substantially tangentially.

In the case of the present invention the distal end of the nozzle 10 runs in close proximity to the plane of the inner wall 6. As a result, the direction of flow of material is both substantially parallel to the said inner wall 6 and directly adjacent the said wall. This leads to an increase in efficiency as the suspension is ejected across the perforated inner wall 6 rather than onto and to some extent through the said wall. This is relevant as the suspension enters the apparatus under pressure and "jamming" of suspension in the apertures of inner wall 6 could otherwise occur.

FIG. 2 shows showering devices 16 and 17. Shower device 16 is located within the screening drum 1 while shower 17 is located outside the said screening drum. The said showers 16 and 17 may be used similtaneously or separately and during or after operation of the apparatus. It has been found that inner shower 16 may be suitably used during operation of a separation phase while shower 17 is found to be useful to clear the excess solids off the outer side of wall 6 after operation.

FIG. 1 shows that the screening drum 1 is located substantially horizontally but to a slight incline. The screening drum may have its incline varied by means of adjustment means 2 and is pivotable on attachment means 18. Once so inclined solid material will be removed from the apparatus by reason of the natural helix and will be discharged from the apparatus in the direction of arrow F. Adjustment means 2 may be adjusted during operation of the apparatus without necessarily ceasing rotation. This allows for the fine tuning of the apparatus while running to allow for efficient processing of material. Allied to this is the ability to alter, while running, the speed of rotation of screening drum 1.

In this way the apparatus may be tuned to reach a satisfactory working performance. This tuning may be achieved by having a sensor or like monitoring device within or outside the apparatus to allow adjustment on a continuous basis.

While not shown in the drawings an axially movable nozzle may be provided for. This travelling manifold or nozzle could be actuated either by an electrical linear unit or one actuated by compressed air. The unit could travel axially through screening drum 1 allowing for the controlled and uniform wear of the screening surface of inner wall 6. This in turn would provide for a longer life of the said screening surface.

It will be readily appreciated that nozzles 10a and 10b need not emanate from the same manifold and that they may be spaced apart, for example, one towards the top of the screening drum and one towards the bottom or one on either side so as not to interfere with each other. Three manifolds each with its own set of nozzles may be used as the variation of nozzle shape and dimension and the variation of rotation and pressure could allow for varied applications of the invention. The use of a number of showers, either within or without the screening drum, is also provided for. The shower and nozzle system may be integral so that feeding and washing takes place at substantially the same time. Finally, the provision of a heated water operated shower system or the like to cater for greasy substances is provided for.

It is thus seem that the present invention provides a simple yet effective separation apparatus whereby suspensions may be separated under pressure.

I claim:

1. A separation apparatus comprising a fine-apertured rotatable screening drum having a longitudinal axis, inlet means to introduce a flow of suspension into the interior of the drum under pressure and feed means comprising a plurality of nozzles, said nozzles being located directly adjacent the inner surface of the screening drum and having outlets directed in the same circumferential plane as said inner surface to eject the introduced suspension in tangential directions onto the inner surface of the screeingn drum, and wherein said nozzles are curved in cross section so as to conform substantially to the contour of the inner surface of the screening drum, and wherein said nozzles have distended outlet ports respectively formed with slotted apertures being elongated with respect to said drum axis.

2. A screening apparatus according to claim 1 wherein the feed means include means for adjusting the quantities of suspension ejected from the nozzles such that the quantities of suspension ejected is variable from one nozzle to another.

3. A screening apparatus according to claim 2 wherein said means for adjusting the quantities of suspension ejected from said nozzles are external of said screening drum such that said nozzles are feed-rate adjustable externally of the screening drum.

4. A separation apparatus according to claim 1 including means for rotating the screening drum in a direction of ejection of suspension onto the screening drum inner surface.

5. A separation apparatus according to claim 1 including means for ejecting suspension onto the inner surface of the drum simultaneously, with and against a direction of rotation of the screening drum.

6. A screening apparatus according to claim 1 including means for adjusting an inclined orientation of the screening drum during operation of the apparatus to enable a rate of discharge of solid material from the drum to be controlled.

7. A method of separation of solids and liquids from a suspension by screening, said method comprising the steps of
 (a) rotating a fine-apertured screening drum;
 (b) introducing a flow of suspension into the drum under pressure;
 (c) ejecting by one or more feed means, being nozzles, the suspension tangentially onto the inner surface of the screening drum, said nozzles being located directly adjacent the inner surface of the screening drum and having outlets directed in the same circumferential plane as that of the inner surface of the screening drum;
 (d) extracting screened solids from within the drum;
 (e) forming the nozzle outlets with elongated slotted apertures;
 (f) individually controlling the flow of suspension from each of the nozzles to precisely coordinate the introduced flow of suspension into the drum with the separation of solids and liquids from the suspension.

8. A separation apparatus according to claim 1 wherein the said nozzles are situated along substantially the length of the screening surface of the drum.

9. A screening apparatus according to claim 1 wherein the feed means is axially movable within the screening drum to facilitate substantially uniform wear on the screening wall.

* * * * *